(12) United States Patent
Liu et al.

(10) Patent No.: US 11,946,453 B2
(45) Date of Patent: Apr. 2, 2024

(54) DAMPING DEVICE AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Yan Liu, Beijing (CN); Liang Bai, Beijing (CN); Shuanghu Li, Beijing (CN); Jiankun Chu, Beijing (CN); Wensi Ren, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 11 days.

(21) Appl. No.: 17/907,130

(22) PCT Filed: Sep. 10, 2020

(86) PCT No.: PCT/CN2020/114582
§ 371 (c)(1),
(2) Date: Sep. 23, 2022

(87) PCT Pub. No.: WO2021/196526
PCT Pub. Date: Oct. 7, 2021

(65) Prior Publication Data
US 2023/0125305 A1    Apr. 27, 2023

(30) Foreign Application Priority Data
Mar. 31, 2020    (CN) .......................... 202010240404.3

(51) Int. Cl.
F03D 7/02    (2006.01)

(52) U.S. Cl.
CPC ...... *F03D 7/0296* (2013.01); *F05B 2260/964* (2013.01)

(58) Field of Classification Search
CPC ........ F03D 7/0296; F03D 80/80; F03D 80/00; F05B 2260/964; Y02E 10/72
See application file for complete search history.

(56) References Cited

U.S. PATENT DOCUMENTS 2,851,848 A * 9/1958 Vibber .................. D01H 1/101
57/58.55
5,269,588 A * 12/1993 Kunz ...................... B60N 2/12
297/341
(Continued)

FOREIGN PATENT DOCUMENTS

CA    3172746 A1 * 10/2021 ............. F03D 13/20
CN    207049253 U    2/2018
(Continued)

OTHER PUBLICATIONS

The International Search Report dated Dec. 29, 2020; PCT/CN2020/114582.
(Continued)

*Primary Examiner* — Pedro J Cuevas (57) ABSTRACT

A damping device and a wind turbine generator system comprising the damping device. The damping device comprises: damping components; structural supports, the structural supports connecting the damping components to a mass block provided on an object to be damped, each structural support comprising a gear, and the gear being rotatably provided on the structural support; and guide rails, wherein each guide rail has a predetermined curvature, each guide rail has a first end used for being rotatably connected to the object to be damped and a second end supported on the corresponding structural support, a tooth portion engaged with a gear is formed on a side portion of each guide rail, and (Continued)

when the mass block swings, the swing of the mass block is converted into transmission by means of the engagement transmission between the guide rail and the gear for input into the corresponding damping component.

20 Claims, 8 Drawing Sheets

(56) References Cited

U.S. PATENT DOCUMENTS

| | | | | |
|---|---|---|---|---|
| 6,783,126 B2* | 8/2004 | Amamoto | ................ | B65H 1/12 |
| | | | | 271/127 |
| 8,919,799 B2* | 12/2014 | Wimmer | ................ | B62K 25/30 |
| | | | | 280/284 |
| 10,180,170 B2* | 1/2019 | Amdisen | .................... | F16F 7/10 |
| 11,255,409 B2* | 2/2022 | Mitsch | ....................... | F16F 7/10 |
| 11,746,749 B2* | 9/2023 | Li | ............................ | F16F 7/116 |
| | | | | 188/379 |
| 2003/0116906 A1* | 6/2003 | Amamoto | ................ | B65H 1/24 |
| | | | | 271/126 |
| 2010/0109282 A1* | 5/2010 | Weagle | ................ | B62K 25/286 |
| | | | | 280/284 |
| 2012/0061933 A1* | 3/2012 | Weagle | ................ | B62K 25/286 |
| | | | | 280/124.11 |
| 2014/0116282 A1* | 5/2014 | Horihan | .................... | B61B 3/02 |
| | | | | 104/89 |
| 2018/0252287 A1 | 9/2018 | Mitsch | | |
| 2019/0024535 A1 | 1/2019 | Mitsch | | |
| 2021/0048088 A1* | 2/2021 | Mitsch | .................... | F16F 15/31 |
| 2022/0163254 A1* | 5/2022 | Rommelmann | ...... | F25D 23/028 |
| 2023/0193875 A1* | 6/2023 | Li | ............................ | F16F 7/116 |
| | | | | 188/379 |

FOREIGN PATENT DOCUMENTS

| | | | | |
|---|---|---|---|---|
| CN | 108350969 A | | 7/2018 | |
| CN | 108603554 A | | 9/2018 | |
| CN | 209687662 U | | 11/2019 | |
| CN | 110552996 A | | 12/2019 | |
| CN | 113464384 A | * | 10/2021 | ............. F03D 13/20 |
| EP | 2696072 A1 | | 2/2014 | |
| EP | 3749878 B1 | * | 3/2022 | ........... E04H 9/0215 |
| EP | 3974649 A1 | * | 3/2022 | ............. F03D 80/80 |
| EP | 4119792 A1 | * | 1/2023 | ............. F03D 13/20 |
| WO | WO-2012027900 A1 | * | 3/2012 | ............. B62K 25/28 |
| WO | 2019/201471 A1 | | 10/2019 | |
| WO | WO-2021196526 A1 | * | 10/2021 | ............. F03D 13/20 |
| WO | WO-2022063872 A1 | * | 3/2022 | ............. F03D 80/80 |

OTHER PUBLICATIONS

The Extended European Search Report dated Oct. 10, 2023; Appln. No. 20928294.6.

* cited by examiner

DAMPING DEVICE AND WIND TURBINE GENERATOR SYSTEM

This disclosure is a national phase application of PCT international patent application PCT/CN2020/114582, filed on Sep. 10, 2020 which claims the priority to Chinese Patent Application No, 202010240404.3, titled "DAMPING DEVICE AND WIND TURBINE GENERATOR SYSTEM", filed with the China National Intellectual Property Administration on Mar. 31, 2020, the entire disclosure of which is incorporated herein by reference.

FIELD

The present application relates to the technical field of wind power generation, and in particular to a damping device capable of reducing installation space and improving the reliability of a wind turbine generator system and a wind turbine generator system including the damping device.

BACKGROUND

As the height of the tower becomes higher and higher, which is a main support structure of a wind turbine generator system, the control requirements for the first-order vibration become more and more urgent. At present, tuned mass dampers are mainly used to control the vibration of towers (especially flexible towers). Generally, when the tower is subjected to an external dynamic force, the tuned mass damper provides the force (damping force) opposite to a vibration direction of the tower through a mass block with the same vibration frequency of the tower, so as to counteract the structural response caused by external excitation. The damper that provides damping force usually includes viscous damper, liquid damper and eddy current damper.

In order to ensure the conversion efficiency of the existing single pendulum tuned mass damper, numerous mechanisms and components are usually provided to absorb the motion potential energy in different swing directions.

Therefore, there is an urgent need for a damping device that can reduce the required space within the effective space of the tower and avoid the risk of interference.

SUMMARY

In order to solve the above technical problems, a damping device and a wind turbine generator system is provided according to the present disclosure, where the damping device can reduce the required space in the effective space of the tower and avoid the risk of interference.

According to an aspect of the present disclosure, a damping device is provided, which includes a damping member; a structural bracket, where the structural bracket connects the damping member to a mass block arranged on an object to be damped, where the structural bracket includes gears, and the gears are rotatably arranged on the structural bracket; a guide rail having a predetermined curvature, a first end of the guide rail is configured to be rotatably connected to the object to be damped, and a second end of the guide rail is supported on the structural bracket, a side portion of the guide rail is formed with a tooth portion that meshes with the gear of the structural bracket, when the mass block swings, the swing of the mass block is converted into rotation through meshing transmission between the guide rail and the gear, and the rotation is transmitted to the damping member.

According to another aspect of the present disclosure, a wind turbine generator system is provided, including: a tower as the object to be damped; the above damping device, the structural bracket is connected to the mass block provided in the tower, and the first end of the guide rail is rotatably connected to an inner wall of the tower.

The damping device according to the present disclosure can provide damping force for the entire wind turbine generator system while ensuring that high conversion efficiency can be obtained in all directions; the maintenance work items can be reduced and the overall reliability can be improved; the number of parts of the damping device can be reduced, the structure can be simplified, and the production cost can be reduced.

BRIEF DESCRIPTION OF THE DRAWINGS

The above and other features and advantages of the present disclosure becomes more apparent from the following detailed description of exemplary embodiments of the present disclosure with reference to the accompanying drawings, in the drawings.

REFERENCE NUMERALS IN THE DRAWINGS

| 1 damping member; | 2 structural bracket; |
|---|---|
| 3 guide rail; | 4 guide groove; |
| 5 guide wheel; | 6 idler roller; |
| 7 object to be damped; | 8 mass block; |
| 9 gear shaft; | 10 first bearing; |
| 11 second bearing; | 12 connecting disk; |
| 13 coupling; | 14 rotor; |
| 15 stator; | 16 ladder; |
| 17 elevator; | 18 pendulum rod. |

DETAILED DESCRIPTION OF THE EMBODIMENTS

Embodiments of the present disclosure are described more fully with reference to the accompanying drawings, in which exemplary embodiments of the present disclosure are shown.

According to an exemplary embodiment of the present disclosure, it provides a damping device, which is capable of avoiding the risk of interference in an effective space while ensuring a reliable space for maintenance work. As an example, the damping device can be applied to a tuned mass damper of a simple pendulum, so as to provide damping force for the object to be damped 7, and achieve the damping effect. For example, in the following exemplary embodiments, an example of the application of the damping device in a wind turbine generator system is described, which is only taken as an example. The damping device according to the exemplary embodiment of the present disclosure can also be applied to other devices or objects to be damped to provide damping force.

The damping device according to the exemplary embodiment of the present disclosure is described in detail below with reference to the accompanying drawings. In the drawings, in order to clearly illustrate the structure of the damping device, only a part of the object to be damped 7, such as a tower, is schematically shown in the form of a circular ring.

Figure 1:
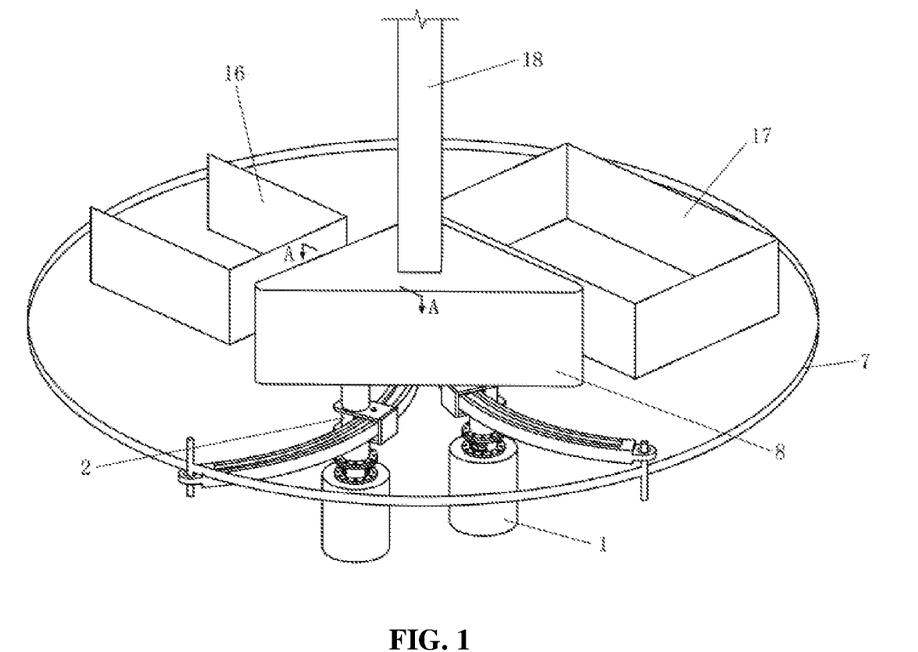
FIG. 1 is a schematic diagram of a damping device applied to a wind turbine generator system according to an exemplary embodiment of the present disclosure.
Figure 2:
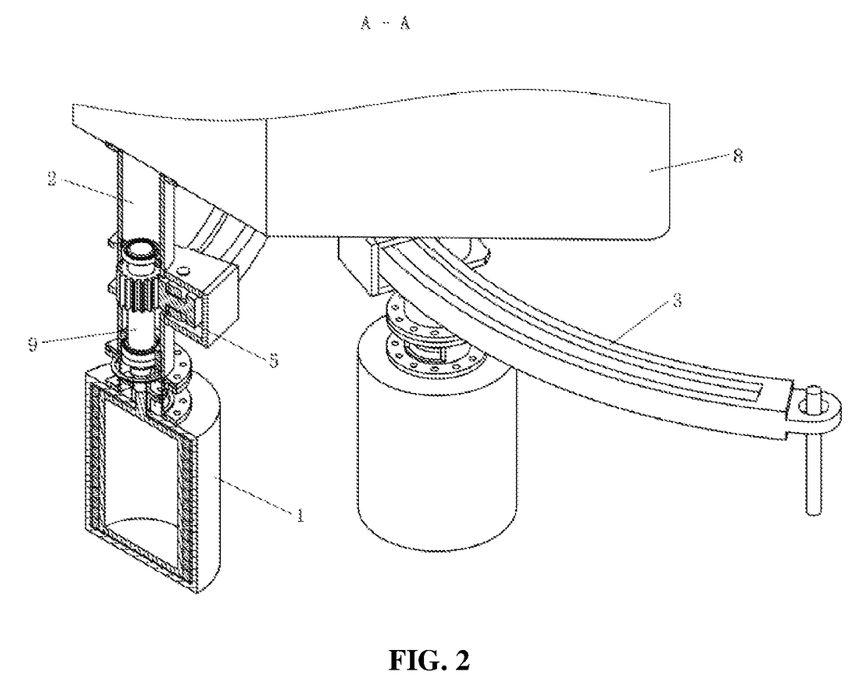
FIG. 2 is a schematic diagram illustrating a partial cross-sectional view of the damping device taken along line A-A in FIG. 1 according to an exemplary embodiment of the present disclosure.
Figure 3:
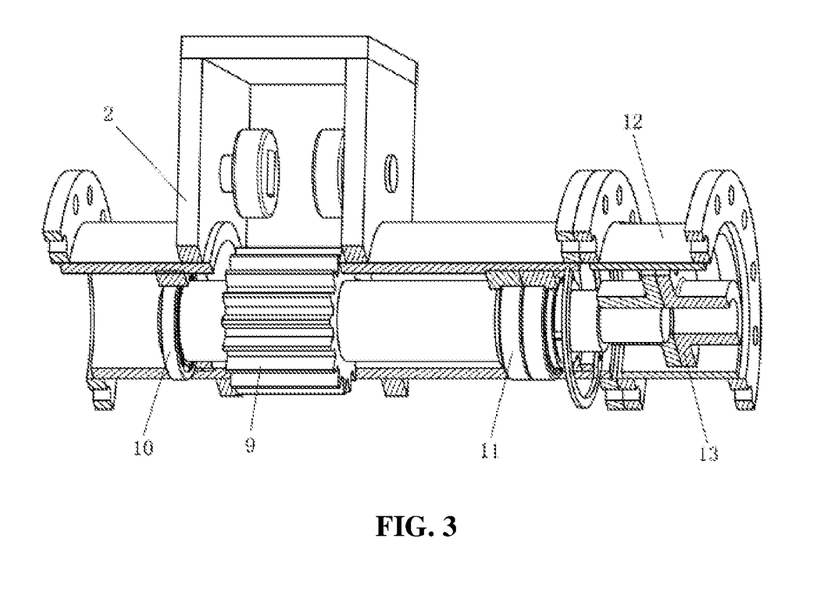
FIG. 3 is an enlarged schematic view showing a gear shaft of the structural bracket shown in FIG. 2.

Referring to FIG. 1 to FIG. 3, a damping device according to an exemplary embodiment of the present disclosure includes: a damping member 1; a structural bracket 2, which connects the damping member 1 to a mass block 8 arranged on the object to be damped 7, where the structural bracket 2 includes gears rotatably arranged thereon; and a guide rail 3 having a predetermined curvature, a first end of the guide rail 3 is configured to be rotatably connected to the object to be damped 7, and a second end of the guide rail 3 is supported on the structural bracket 2. A side portion of the guide rail 3 is formed with a tooth portion that meshes with the gear. When the mass block 8 swings, the swing of the mass block 8 is converted into rotation through meshing transmission between the guide rail 3 and the gear, and the rotation is transmitted to the damping member 1. The damping member 1 provides damping force to achieve vibration reduction. Here, the structural bracket 2 and the guide rail 3 can constitute a damping conversion mechanism for converting the swing of the mass block 8 into rotation transmitted to the damping member 1.

The first end of the guide rail 3 in its length direction is configured to be rotatably connected to the object to be damped 7. For example, the first end of the guide rail 3 can be fixedly connected to the object to be damped 7 by using a knuckle bearing. The knuckle bearing can not only ensure the swing of the guide rail 3 in the horizontal direction, but also ensure the swing of the guide rail 3 in the vertical direction caused by the swing of the mass block 8. Moreover, the knuckle bearing can also bear a large load. However, the embodiment of the present disclosure is not limited to this, and other connectors may also be used instead of the knuckle bearings to realize the rotatable connection of the first end of the guide rail 3 to the object to be damped 7. According to an embodiment of the present disclosure, the guide rail 3 can be formed by a rack having a predetermined curvature, but is not limited thereto. The guide rail 3 can be formed by other components with a predetermined curvature and teeth on the side meshed with the gears in the structural bracket 2.

Referring to FIG. 3, as an example, the gears included in the structural bracket 2 may be in the form of gear shafts 9. However, the embodiments of the present disclosure are not limited thereto, and the gears may also in other forms as long as they can mesh with the teeth of the guide rail 3. For example, other toothed components such as worm gear can be used to form the gears in the structural bracket 2. The gear shaft 9 is rotatably mounted in the structural bracket 2 by bearings. The gear shaft 9 can be mounted in the structural bracket 2 through the first bearing 10 and the second bearing 11 at both ends, and the gear shaft 9 itself can rotate around its rotation axis. The gear shaft 9 can be connected to the damping member 1 by a coupling 13 at the shaft end. When the mass block 8 swings with the vibration of the object to be damped 7, the gear of the gear shaft 9 rotates around the shaft by meshing with the teeth of the guide rail 3 with a predetermined curvature, and the rotation is transmitted to the connected damping member 1 through the coupling 13 at the shaft end. The damping force provided by the damping member 1 damps the amplitude of the swing, thereby realizing vibration damping.

The structural bracket 2 can further include a connecting disk 12 with connecting flanges (described in detail below). Moreover, the connecting disk 12 can have a hollow accommodation space, and the coupling 13 can be accommodated in the accommodation space of the connecting disk 12. In this way, it can not only protect the coupling 13, but also facilitates the installation and removal of the damping member 1.

Figure 4:
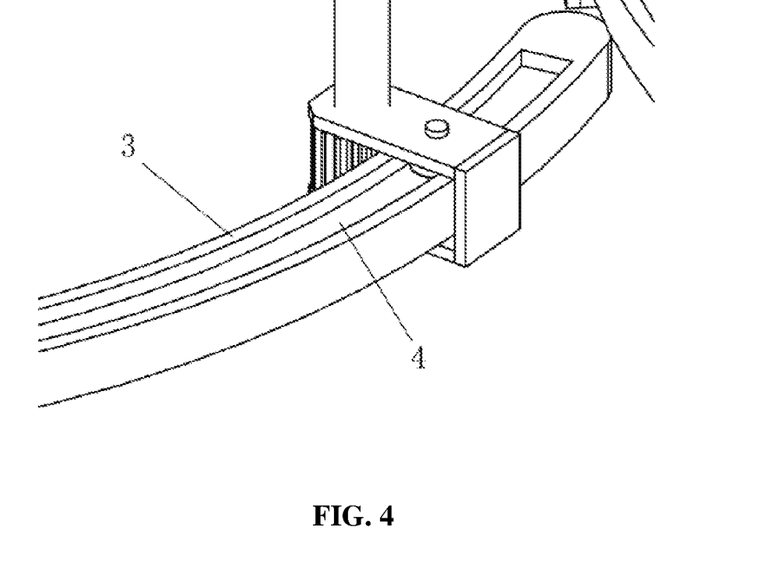
FIG. 4 is a schematic diagram illustrating a guide rail of a damping device according to an exemplary embodiment of the present disclosure.
Figure 5:
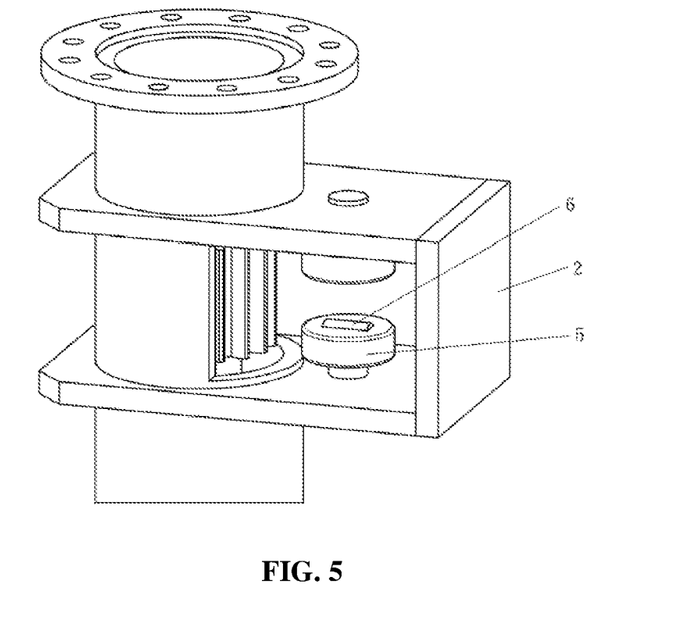
FIG. 5 is a schematic diagram illustrating a guide roller in a guide structure of a damping device according to an exemplary embodiment of the present disclosure.

In order to realize the supporting and guiding functions, guide structures can also be formed on the structural bracket 2 and the guide rail 3, which match with each other. Referring to FIG. 4 to FIG. 5, the guide structure according to the exemplary embodiment of the present disclosure may include a guide groove 4 and a guide roller 5. The guide grooves 4 are formed in the first and second surfaces of the guide rail 3, which are opposed to each other in the thickness direction. The guide roller 5 is rotatably arranged at a position of the structural bracket 2, where the position faces the guide groove of the guide rail 3 and is accommodated in the guide groove 4.

The guide groove 4 can be recessed from the first surface or the second surface of the guide rail 3 in the thickness direction, and the guide groove 4 extends along the length direction of the guide rail 3 to provide a sufficient stroke. The rotation axis of the guide roller 5 is parallel to the side wall of the guide groove 4, so that the guide roller 5 can be adjacent to the side wall of the guide groove 4 and move along the guide groove 4 with the swing of the mass block 8. In this way, the structural bracket 2 moves along the trajectory determined by the guide rails 3. With the above-mentioned guide structure, the structural bracket 2 moves along the track determined by the guide rail 3, so as to transmit the swing motion of the mass block 8 to the rotating motion of the gear meshed with the teeth of the guide rail 3, and the rotating motion is transmitted to the damping member 1.

According to the exemplary embodiment of the present disclosure, in order to better support the weight of the guide rail 3, besides that the guide roller 5 itself is rotatable, the guide roller 5 further includes an idler roller 6 rotatably disposed at the end. The idler roller 6 contacts a groove bottom surface of the guide groove 4, and a rotation axis of the idler roller 6 is parallel to the groove bottom surface. In this way, the guide structure can not only play a guiding role, but also play a role of supporting the guide rail 3 in a follow-up manner. In addition, the guide structure can maintain the working backlash between the guide rail 3 and the gears of the structural bracket 2 no matter in the static or moving state, thereby reducing gear wear, prolonging gear life, and improving motion transmission accuracy.

In order to prolong the life of the guide roller 5, an eccentric mounting sleeve can also be provided to mount the guide roller 5 on the structural bracket 2. In this way, even after the guide roller 5 is worn for a long time, the centering work can be performed by the eccentric mounting sleeve.

Figure 6:
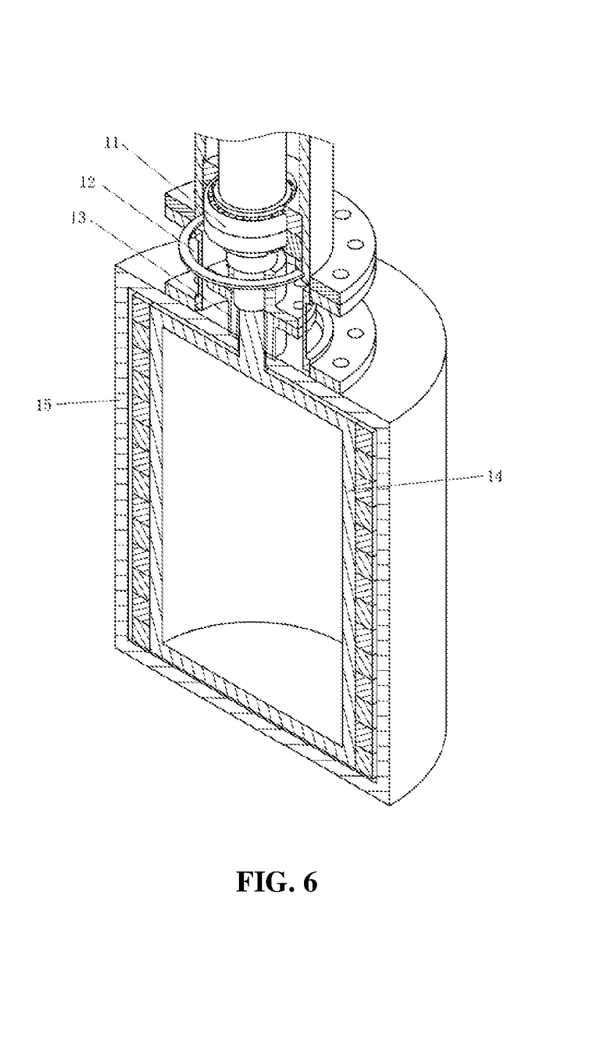
FIG. 6 is an enlarged schematic view showing the damping member shown in FIG. 2.

According to the exemplary embodiment of the present disclosure, the damping member 1 can use the eddy current principle to consume the excitation of the vibration of the object to be damped 7, thereby providing damping force. Referring to FIG. 6, the damping member 1 can include a rotor 14 and a stator 15. The gear shaft 9 can be connected to the rotor 14 of the damping member 1 through a coupling 13. According to the exemplary embodiment of the present disclosure, in the damping member 1, the rotor 14 is located inside the stator 15. In addition, the rotor 14 is connected to the shaft end of the gear shaft 9 through the coupling 13, so that the rotor 14 can rotate with the rotation of the gear shaft 9. Referring to FIG. 3 and FIG. 6, both ends of the connecting disk 12 can be provided with connecting flanges, so that one end of the connecting disk 12 can be detachably connected to the structural bracket 2 through the connecting flanges and connecting pieces such as bolts. The other end of the connecting disk 12 can be detachably connected to the stator 15 of the damping member 1 through a connecting flange and a connecting piece such as a bolt. When the gear in the structural bracket 2 converts the swing motion of the mass block 8 into the rotating motion, and transmits the rotating motion to the rotor 14 of the damping part 1 through the coupling 13, the magnetic steel on the rotor 14 can produce eddy current damping that restrains the relative movement of the mass block 8 on the conductor copper plate on the stator 15 of the damping member 1. Through eddy current damping, the vibration energy is dissipated through the resistance thermal effect of the conductor to achieve the vibration reduction effect.

According to an exemplary embodiment of the present disclosure, a wind turbine generator system is provided, which includes a tower as the object to be damped 7 and the damping device as described above. The first end of the structural bracket 2 is connected to the mass block 8 provided in the tower, and the first end of the guide rail 3 is rotatably connected to the inner wall of the tower. Specifically, referring to FIG. 1 and FIG. 2, the structural bracket 2 can be connected to the lower surface of the mass block 8 by connecting pieces such as bolts, and the first end of the guide rail 3 can be connected to the inner wall of the tower by connecting pieces such as knuckle bearing.

In order to be able to provide sufficient damping force, the wind turbine generator system may include two of the above-mentioned damping devices. Considering that there are ladders 16, elevators 17 and other devices in the tower, and the mass block 8 of the single pendulum tuned mass damper is vertically arranged in the tower through the pendulum rod 18, the space for mounting the damping device is limited. In this case, in order to avoid interference in an effective space and ensure a reliable space for maintenance work, the two guide rails 3 of the two damping devices can be arranged to be staggered from each other by a predetermined distance in the height direction of the tower. Here, the structural bracket 2 can be set to be adjustable in height, so that it facilitates an adjustment to the positions of the two guide rails 3 to be staggered from each other in the height direction. According to an example, the structural bracket 2 can be made in sections, or can have a retractable structure, so that the positions of the two guide rails 3 can be flexibly adjusted according to the size of the installation space, thereby improving the operability.

In addition, in order to ensure high conversion efficiency in all directions, the two guide rails 3 of the two damping devices can be arranged to be opposite to each other. Here, the two guide rails 3 facing away from each other means that the bending directions of the two guide rails 3 are opposite. Referring to the following FIG. 7 to FIG. 10, the signs of curvature radii of the two guide rails 3 are opposite. For example, viewed from above the damping device, the two guide rails 3 of the two damping devices are in a general " 八|" shape (refer to FIGS. 7, 8 and 10) or an approximate "X" shape (refer to FIG. 9) in a specific state (for example, in an initial static state or a specific motion state).

Here, the absolute values of the curvature radii of the two guide rails 3 may be the same or different, and the curvature radii of the two guide rails 3 may be properly set according to the installation space for the damping device. According to an exemplary embodiment of the present disclosure, the absolute values of the curvature radii of the two guide rails 3 may be set to be the same.

Figure 7:
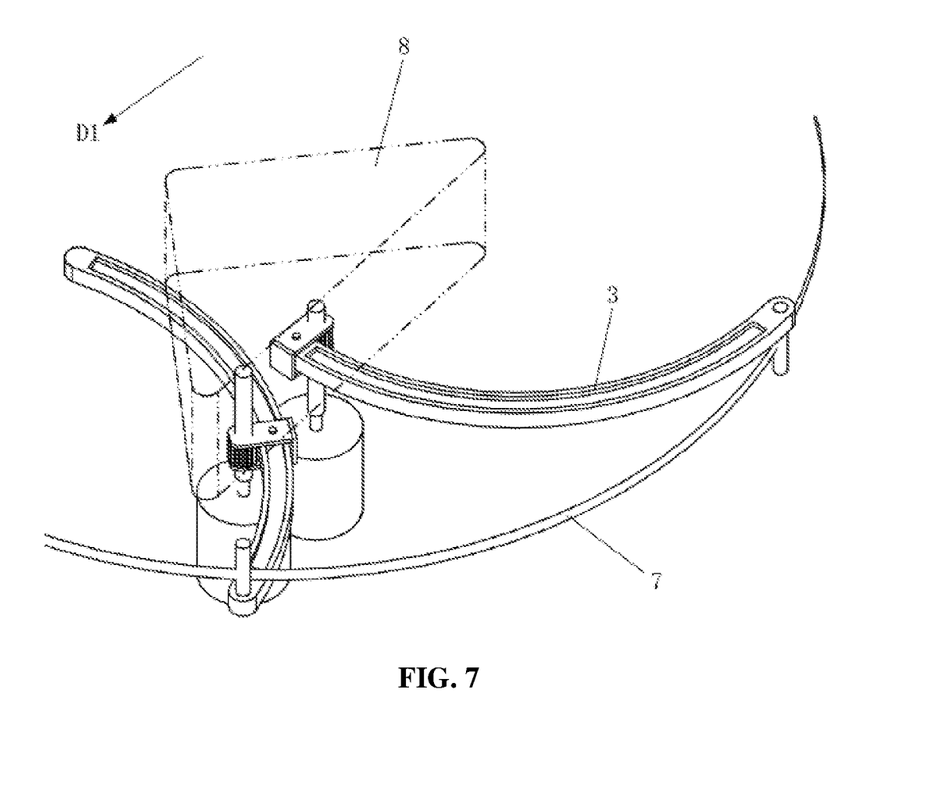
FIG. 7 and FIG. 8 are diagrams schematically showing the motion state of the damping device when the swing direction of the mass block is parallel to the line connecting the fixed points of the first ends of the two guide rails.
Figure 8:
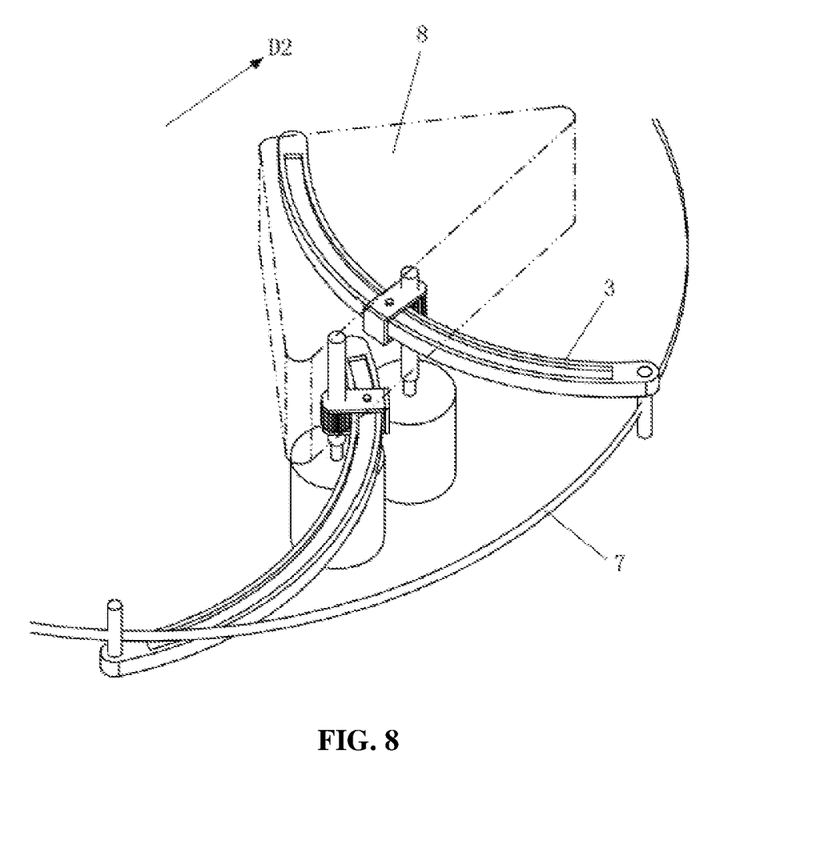
Figure 9:
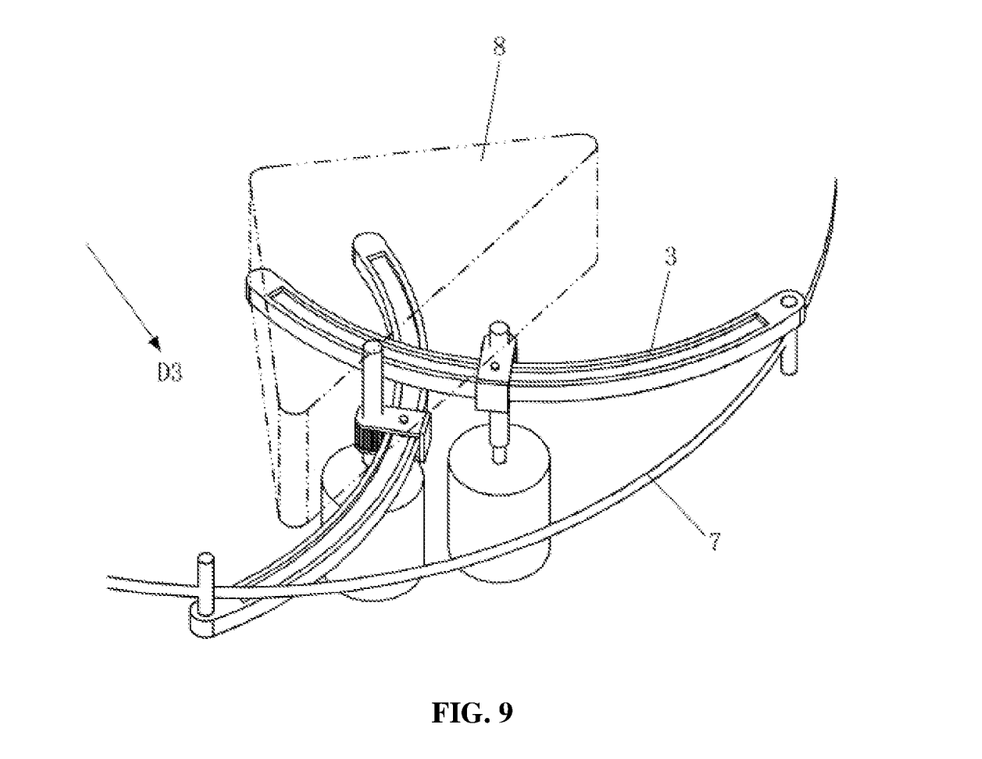
FIG. 9 and FIG. 10 are diagrams schematically showing the motion state of the damping device when the swing direction of the mass block is perpendicular to the line connecting the fixed points of the first ends of the two guide rails.
Figure 10:
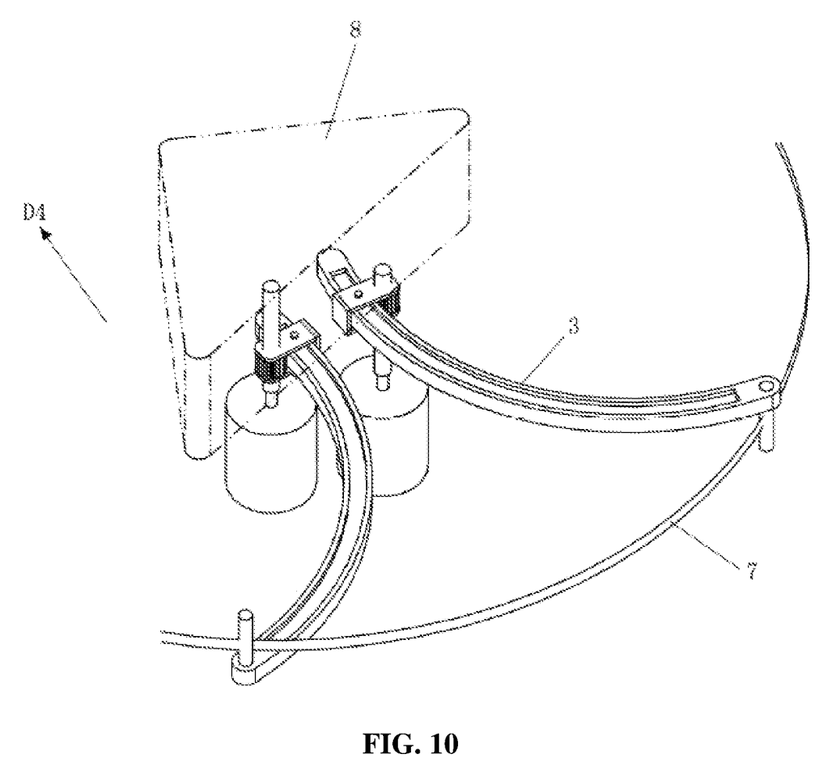

The advantages of the damping device applied in the wind turbine generator system according to the exemplary embodiment of the present disclosure are described below with reference to FIG. 7 to FIG. 10. FIG. 7 and FIG. 8 show the motion state of the damping device when the swing direction of the mass block 8 is parallel to the line connecting the fixed points of the first ends of the two guide rails 3. The arrows in FIG. 7 and FIG. 8 respectively indicate the swing directions D1 and D2 of the mass block 8. FIG. 9 and FIG. 10 show the motion state of the damping device when the swing direction of the mass block 8 is perpendicular to the line connecting the fixed points of the first ends of the two guide rails 3. The arrows in FIG. 9 and FIG. 10 respectively indicate the swing directions D3 and D4 of the mass block 8. In FIG. 7 to FIG. 10, in order to clearly show the motion state of the damping device, the mass block 8 is shown with a double-dot line. It can be seen from the motion states shown in FIG. 7 to FIG. 10 that the damping device with the guide rail 3 with a predetermined curvature has the following advantages: in case of being with equal engagement length, the turning radius of the guide rail 3 with a predetermined curvature is smaller, and the required installation space is also smaller; the two guide rails 3 are arranged staggered from each other in the height direction, which further reduces the space requirement; when the swing direction of the mass block 8 is perpendicular to a connecting line between the fixed points of the first ends of the two guide rails 3, the guide rail 3 with curvature can well convert the swing into the rotation of the gear in the structural bracket 2, and then transmit it to the damping member 1. In addition, it only needs two damping devices to provide damping force for the entire wind turbine generator system, and high conversion efficiency can be obtained in all directions.

The damping device according to the present disclosure can provide damping force for the entire wind turbine generator system while ensuring that high conversion efficiency can be obtained in all directions; the required installation space is small, the interference is avoided in the effective space, and the reliable space for maintenance work is guaranteed; the gear wear can be reduced, the gear life can be prolonged, and the motion transmission accuracy can be improved; the maintenance work items can be reduced and the overall reliability can be improved; the number of parts of the damping device can be reduced, the structure can be simplified, and the production cost can be reduced.

Although the present disclosure has been particularly shown and described with reference to the exemplary embodiments thereof, it should be understood by those skilled in the art that various changes in form and details can be made without departing from the spirit and scope of the present disclosure defined by the claims.

INDUSTRIAL APPLICABILITY

The damping device and the wind turbine generator system according to the exemplary embodiment of the present disclosure can provide damping force for the whole wind turbine generator system, realize vibration reduction, reduce installation space, and ensure reliable space for maintenance work.

The invention claimed is:

1. A damping device, comprising:
a damping member;
a structural bracket, wherein the structural bracket connects the damping member to a mass block arranged on an object to be damped, wherein the structural bracket comprises a gear, and the gear is rotatably arranged on the structural bracket;
a guide rail having a predetermined curvature, wherein a first end of the guide rail is configured to be rotatably connected to the object to be damped, and a second end of the guide rail is supported on the structural bracket, wherein a side portion of the guide rail is formed with a tooth portion that meshes with the gear,
wherein, when the mass block swings, the swing of the mass block is converted into rotation through meshing transmission between the guide rail and the gear, and the rotation is transmitted to the damping member.

2. The damping device according to claim 1, wherein guide structures, which are matched with each other, are formed on the structural bracket and the guide rail, respectively.

3. The damping device according to claim 2, wherein the guide structure comprises:
a guide groove, wherein the guide grooves are formed in the first and second surfaces of the guide rail, which are opposed to each other in the thickness direction;
a guide roller, wherein the guide roller is rotatably arranged at the position of the structural bracket facing the guide groove of the guide rail, and is accommodated in the guide groove.

4. The damping device according to claim 3, wherein the guide groove is recessed from the first surface or the second surface of the guide rail along the thickness direction, and the guide groove extends along a length direction of the guide rail; wherein a rotation axis of the guide roller is parallel to a side wall of the guide groove.

5. The damping device according to claim 3, wherein the guide roller comprises an idler roller rotatably arranged at an end thereof, wherein the idler roller contacts a groove bottom surface of the guide groove, and a rotation axis of the idler roller is parallel to the groove bottom surface.

6. The damping device according to claim 3, wherein the guide roller is mounted on the structural bracket by means of an eccentric mounting sleeve.

7. The damping device according to claim 1, wherein the gear is configured as a gear shaft, which is rotatably mounted in the structural bracket through a bearing, wherein the damping member comprises a rotor and a stator, and the rotor is connected to the gear shaft through a coupling.

8. The damping device according to claim 7, wherein the rotor is located inside the stator, and the rotor is connected to a shaft end of the gear shaft through the coupling.

9. The damping device according to claim 7, wherein the structural bracket further comprises a connecting disk, wherein the connecting disk has a hollow accommodating space, and the coupling is accommodated in the accommodating space of the connecting disk.

10. The damping device according to claim 9, wherein both ends of the connecting disk are provided with connecting flanges and are respectively mounted to the structural bracket and the stator.

11. The damping device according to claim 1, wherein the guide rail is a rack with a predetermined radius of curvature.

12. A wind turbine generator system, comprising
a tower as an object to be damped;
the damping device according to claim 1, wherein the structural bracket is connected to the mass block provided in the tower, and the first end of the guide rail is rotatably connected to an inner wall of the tower.

13. The wind turbine generator system according to claim 12, further comprising two damping devices.

14. The wind turbine generator system according to claim 13, wherein the two guide rails of the two damping devices are offset from each other by a predetermined distance in a height direction of the tower.

15. The wind turbine generator system according to claim 14, wherein the height of the structural bracket is adjustable.

16. The wind turbine generator system according to claim 15, wherein the structural bracket is made by sections, or the structural bracket has a retractable structure.

17. The wind turbine generator system according to claim 14, wherein the two guide rails of the two damping devices are arranged facing away from each other.

18. The wind turbine generator system according to claim 17, wherein the signs of the curvature radii of the two guide rails of the two damping devices are opposite.

19. The wind turbine generator system according to claim 17, wherein the absolute values of the curvature radii of the two guide rails of the two damping devices are the same.

20. The wind turbine generator system according to claim 17, wherein the absolute values of the curvature radii of the two guide rails of the two damping devices are different.

* * * * *